(12) United States Patent
Roberts

(10) Patent No.: US 12,500,460 B2
(45) Date of Patent: Dec. 16, 2025

(54) ALTERNATOR ASSEMBLY

(71) Applicant: RAPID POWER INDUSTRIES, Salisbury (AU)

(72) Inventor: Mark Roberts, Salisbury (AU)

(73) Assignee: RAPID POWER INDUSTRIES, Salisbury (AU)

( * ) Notice: Subject to any disclaimer, the term of this patent is extended or adjusted under 35 U.S.C. 154(b) by 247 days.

(21) Appl. No.: 18/258,149

(22) PCT Filed: Dec. 16, 2021

(86) PCT No.: PCT/AU2021/051501
§ 371 (c)(1),
(2) Date: Jun. 16, 2023

(87) PCT Pub. No.: WO2022/126192
PCT Pub. Date: Jun. 23, 2022

(65) Prior Publication Data
US 2024/0113574 A1    Apr. 4, 2024

(30) Foreign Application Priority Data

Dec. 17, 2020  (AU) ................................ 2020904705
Aug. 24, 2021  (AU) ................................ 2021106787

(51) Int. Cl.
*H02K 1/24* (2006.01)
*H02K 3/52* (2006.01)
*H02K 5/20* (2006.01)

(52) U.S. Cl.
CPC ............. *H02K 1/243* (2013.01); *H02K 3/528* (2013.01); *H02K 5/203* (2021.01)

(58) Field of Classification Search
CPC ........ H02K 1/185; H02K 1/187; H02K 1/243; H02K 5/1732; H02K 19/24; H02K 3/525; H02K 5/203; H02K 15/02; H02K 11/05
See application file for complete search history.

(56) References Cited

U.S. PATENT DOCUMENTS

| 4,431,931 A | 2/1984 | Perrier et al. |
| 2002/0053855 A1 | 5/2002 | Tan et al. |

(Continued)

FOREIGN PATENT DOCUMENTS

| CN | 111682714 A | 9/2020 |
| DE | 2548313 A1 | 5/1977 |

(Continued)

OTHER PUBLICATIONS

International Search Report and Written Opinion, as issued in connection with International Patent Application No. PCT/AU2021/051501, dated Feb. 23, 2022.

*Primary Examiner* — Leda T Pham
(74) *Attorney, Agent, or Firm* — Maschoff Brennan

(57) ABSTRACT

A vehicle brushless alternator assembly comprising: a claw pole rotor assembly having a pair of opposing pole pieces, the rotor defining an axis of rotation, each of the pole pieces having a plurality of circumferentially spaced pole fingers extending axially, the pole fingers of the rotor alternating between north and south magnetic polarities upon energization of the field coil; a cylindrical stator comprising armature enveloping the magnetic claw poles, the stator arranged coaxially relative to the drive shaft; a field coil structured to be positioned coaxially within an internal cavity of said rotor to arrange the field coil in a spaced apart relationship relative to internal walls defining the internal cavity of the said rotor; and a housing assembly surrounding said cylindrical stator with the drive shaft being supported by the housing assembly wherein the field coil is fixedly mounted to the housing assembly.

15 Claims, 13 Drawing Sheets

(56) References Cited

U.S. PATENT DOCUMENTS

| | | | |
|---|---|---|---|
| 2008/0012448 A1* | 1/2008 | Hayashi | H02K 1/185 |
| | | | 310/263 |
| 2008/0265707 A1 | 10/2008 | Bradfield | |
| 2010/0052456 A1 | 3/2010 | Hamada | |
| 2013/0015732 A1* | 1/2013 | Bradfield | H02K 3/525 |
| | | | 29/598 |
| 2013/0088102 A1* | 4/2013 | Zook | H02K 5/203 |
| | | | 29/596 |

FOREIGN PATENT DOCUMENTS

| | | |
|---|---|---|
| FR | 2609583 A3 | 7/1988 |
| WO | 2017082704 | 5/2017 |

* cited by examiner

ALTERNATOR ASSEMBLY

TECHNICAL FIELD

The present invention relates to an alternator assembly and a method of assembling an alternator.

BACKGROUND

Any references to methods, apparatus or documents of the prior art are not to be taken as constituting any evidence or admission that they formed, or form part of the common general knowledge.

Alternator design is known in the art. It is a fundamental principle of physics that when a magnet rotates in a wire loop, a current is induced. A magnet has a south pole and a north pole. Assume that the north pole is just passing a top part of the wire loop and the south pole is just passing the bottom part of the loop. When the magnet has rotated through 180 degrees, the south pole will be passing the top part of the loop while the north pole will be passing the bottom part of the loop. This causes the direction of induced current to be reversed. In this way, alternating current is induced in each turn of wire in a stator of an alternator.

In an alternator, a rotor is spun inside a stator. The stator includes multiple windings of wire (also known as an "armature"). A single turn would not induce enough voltage nor carry enough current for typical applications of an alternator. Therefore, a practical alternator has a stator with many turns of wire provided in the form of an armature.

The rotor defines an electromagnet that provides a magnetic field that is spun inside the windings of wire to generate current. In a brushed alternator, a relatively small field current used to define the electromagnet is supplied to the rotor by two small brushes that each ride on separate and continuous slip rings. Field current passes through the brushes into the slip rings into the rotor.

There are typically three separate windings of wire in the stator arranged so that the AC (alternating current) that is generated by each winding is slightly out of phase compared to the other windings. A rectifier circuit including diodes is used to convert the AC to DC (direct current). The diodes are arranged so that current from each of the three stator wires is only allowed to pass in one direction, and the three outputs are connected together. A voltage regulator is also provided to the DC output to keep the output voltage relatively steady. The voltage regulator can be a mechanical or solid-state device.

Brushes that ride against the slip rings of the rotor of an alternator are components that are likely the number one failure mode of an alternator since the brushes wear out over time due to friction. Such brushes are conventionally internal, and are housed inside the housing of an alternator. For conventional alternators, in order to changes brushes, the alternator must be removed from service and substantially disassembled. The brush blocks then have to be removed from inside of a rear shell housing component after the rear shell has been removed from the rest of the alternator. Alternators that are fitted to cars and light commercial vehicles use such brushes and these alternators can last for 100,000 kms to 300,000 kms.

In off-road usage (mining, agricultural, recreational and 4WD usage), the brushes are susceptible to dust, dirt, moisture and corrosion. Brushed alternators in such applications can fail after short periods of exposure.

Larger vehicles typically use brushless alternators which are also known in the art. However, these brushless rotors have significantly less electrical capacity and performance compared to a similarly sized alternator due to the extra air gap in the magnetic field of the excitation circuit of the brushless design. Because of this inherent inefficiency in their design, brushless alternators require larger rotors in order to produce equivalent outputs of the compact brushed alternators. The larger size of the brushless alternators results in the entire alternator assembly being 30-50% larger than a brushed alternator. As a result, existing brushless alternators cannot be used for swapping a brushed alternator especially in smaller engine spaces of light vehicles.

In view of the above, it is desirable to provide a brushless with a compact configuration which can easily be used for replacing a brushed alternator without a reduction in electrical capacity and output. It would also be desirable to provide a method of upgrading or converting a brushed alternator to a brushless alternator without increasing the overall volume of the alternator assembly and without a reduction in electrical performance.

SUMMARY OF INVENTION

In an aspect, the invention provides a vehicle brushless alternator assembly comprising:
  a claw pole rotor assembly having a pair of opposing pole pieces, the rotor defining an axis of rotation, each of the pole pieces having a plurality of circumferentially spaced pole fingers extending axially, the pole fingers of the rotor alternating between north and south magnetic polarities upon energization of the field coil;
  a cylindrical stator comprising armature enveloping the magnetic claw poles, the stator arranged coaxially relative to the drive shaft;
  a field coil structured to be positioned coaxially within an internal cavity of said rotor to arrange the field coil in a spaced apart relationship relative to internal walls defining the internal cavity of the said rotor; and
  a housing assembly surrounding said cylindrical stator with the drive shaft being supported by the housing assembly wherein the field coil is fixedly mounted to the housing assembly.

In an embodiment, each end portion of the rotor, air flow directing vanes are circumferentially arranged and shaped to draw air through vents provided in walls of the housing assembly and directing the air in a radially inward direction towards the rotational axis of the drive shaft when the rotor undergoes rotation.

In an embodiment, each pole piece includes a pole yoke which defines an axially facing surface, with the pole fingers extend axially from the pole yoke such that the flow directing vanes are integrally formed with the pole yoke of the rotor.

In an embodiment, each vane comprises a leading edge and trailing portion formed integrally with the yoke of the rotor with a pair of oppositely arranged air flow directing surfaces of the vane extending between the leading edge and the trailing edge.

In an embodiment, the oppositely arranged air flow directing surfaces are defined by an outer edge portion and an inner edge portion wherein the outer edge portion is located at a circumferentially outer location and wherein the inner edge is located at a radially inner portion.

In an embodiment, in at least a first arrangement a first plurality of vanes are arranged to surround the field coil positioned in the internal cavity during use.

In an embodiment, the pole fingers comprise a trapezoidal shape which extend axially from an extreme radial outer edge of each of the pole piece towards the other pole piece, such that each pole finger of the pole piece is situated in a space defined between two consecutive pole fingers of the other pole piece; and a interpole space magnetic assembly is disposed in at least one interpole space between a pair of adjacently located pole fingers of the first and second pole piece.

In an embodiment, the interpole space magnetic assembly comprises magnetic material configured to be received in a groove located in spaced edge portions of the pair of adjacently located pole fingers.

In an embodiment, the magnetic assembly comprises a first lateral portion adapted to be engaged with a first of the pair of the pole fingers and a second lateral portion adapted to be engaged with a second of the pair of pole fingers such that the first and second lateral portions have opposite polarities.

In an embodiment, the internal cavity is substantially cylindrical for receiving a cylindrical portion of the field coil.

Preferably, the field coil comprises: an axial surface that is spaced away from inner walls defining the internal cavity of the rotor; and a medial surface of the field coil that is substantially transverse relative to the axis of rotation wherein the medial surface is configured for being mounted to the housing assembly.

In an embodiment, the medial surface comprises a fastening arrangement for mounting the field coil on the housing assembly.

In an embodiment, the housing assembly comprises a hollow cooling jacket shaped to substantially surround the field coil, the coolant block with a coolant inlet and a coolant outlet for circulation of a liquid phase coolant therethrough.

In an embodiment, during use, the cooling jacket is positioned between a frontal housing member and a rear housing member and wherein body portions of the cooling jacket are structured to be fastened to the frontal housing and the rear housing.

In an embodiment, the hollow cooling jacket comprising internal fluid flow passages to allow flow of the liquid phase coolant through the body of the jacket to absorb heat from a region surrounding the cylindrical stator.

In yet another aspect, the invention provides a method of modifying a brushed alternator for vehicles, wherein the brushed alternator comprises: a housing assembly including a first portion, and a second portion having a plurality of electrical connectors and having an aperture; a cylindrical stator supported at least partially by the first portion of the housing; a rotor assembly including first and second slip rings, and including a rotor shaft configured to rotate about an axis, the shaft having first and second ends; and a removable brush assembly removably mounted to the housing, a resistor, and brush blocks configured to support brushes for engagement with the slip rings, to pass a force current through the rotor via the slip rings, the method comprising the steps of:

removing the brush assembly mounted to the housing;
removing the rotor assembly and replacing said rotor assembly with a replacement claw pole rotor assembly having a pair of opposing pole pieces, the rotor defining an axis of rotation along a drive shaft of the replacement rotor, each of the pole pieces having a plurality of circumferentially spaced pole fingers extending axially, the pole fingers of the rotor alternating between north and south magnetic polarities upon energization of the field coil;

positioning a field coil coaxially within an internal cavity of the replacement rotor to arrange the field coil in a spaced apart relationship relative to internal walls defining the internal cavity of the replacement rotor;
positioning the cylindrical stator to envelop the magnetic claw poles, the stator being arranged coaxially relative to the drive shaft;
positioning the housing assembly to surround the cylindrical stator with the drive shaft of the replacement rotor being supported by the housing assembly; and
fixedly mounting the field coil to the housing assembly.

BRIEF DESCRIPTION OF THE DRAWINGS

Example embodiments will be described and explained with additional specificity and detail through the use of the accompanying drawings in which.

DETAILED DESCRIPTION OF PREFERRED EMBODIMENTS

Figure 1A:
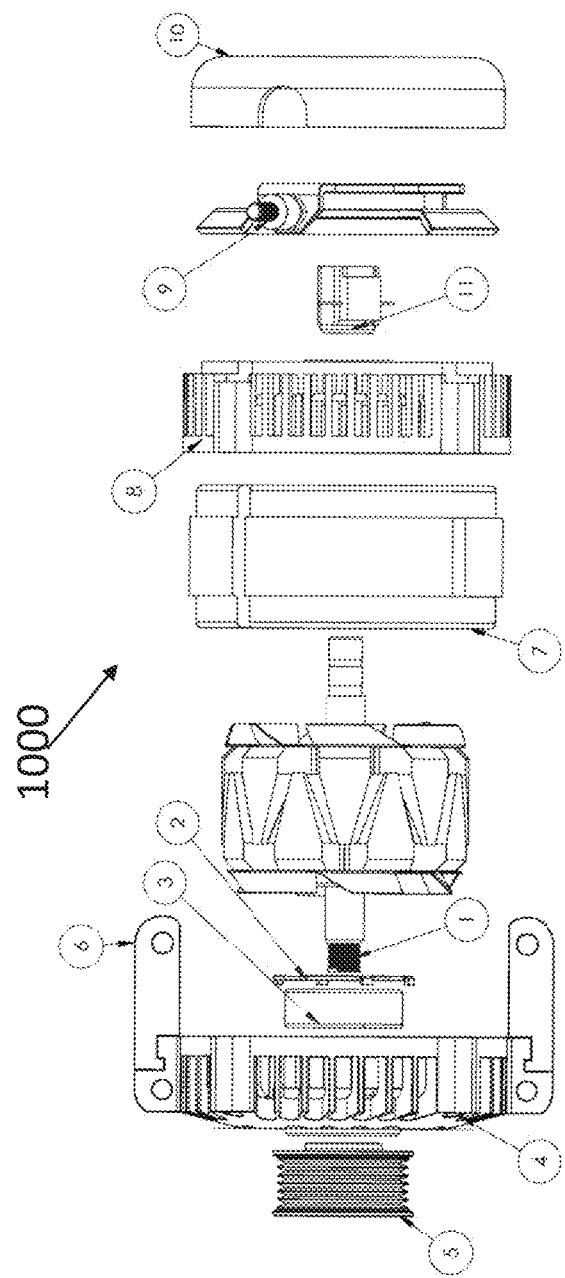
FIGS. 1A and 1B illustrate an example exploded view of a brushed alternator.
Figure 1B:
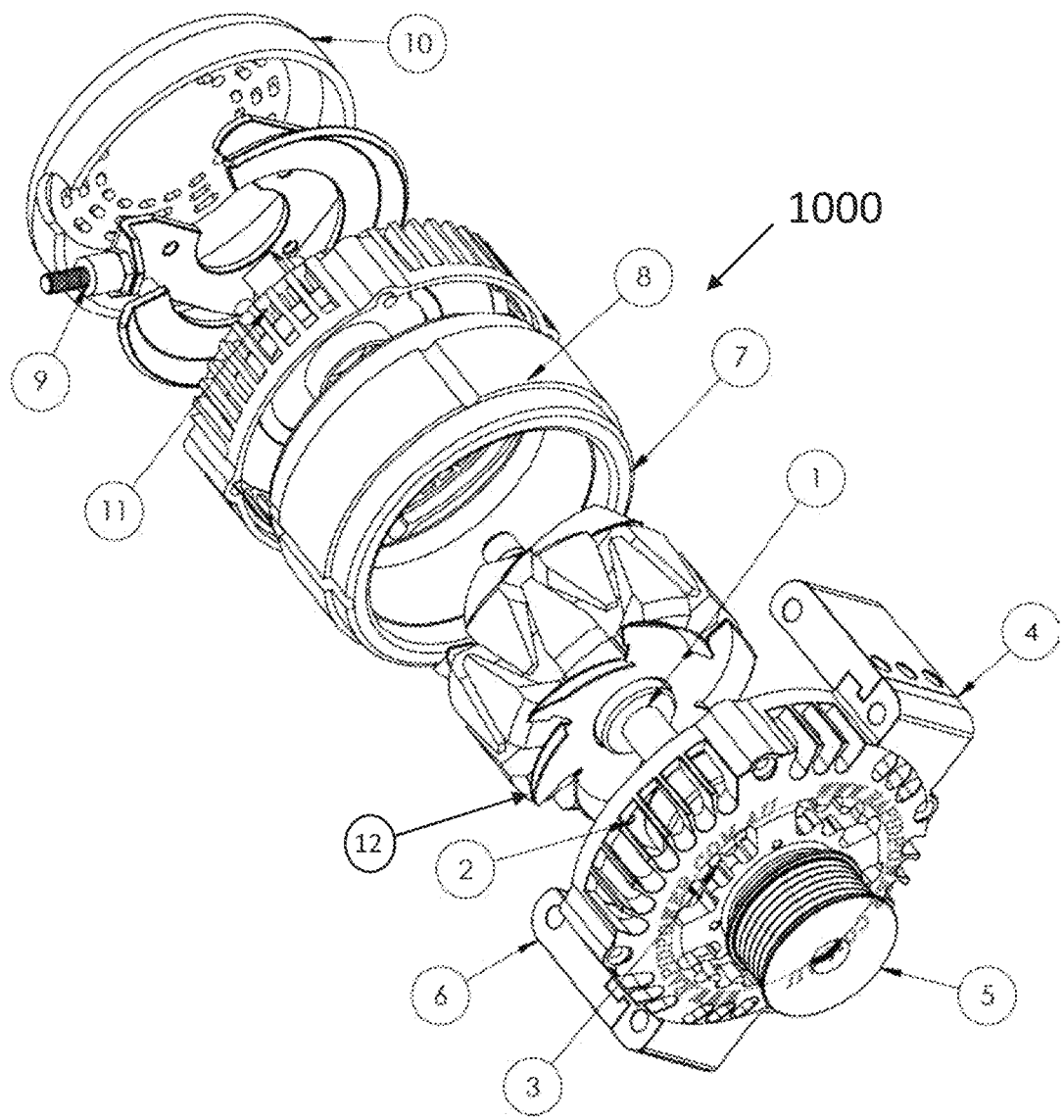
Figure 1C:
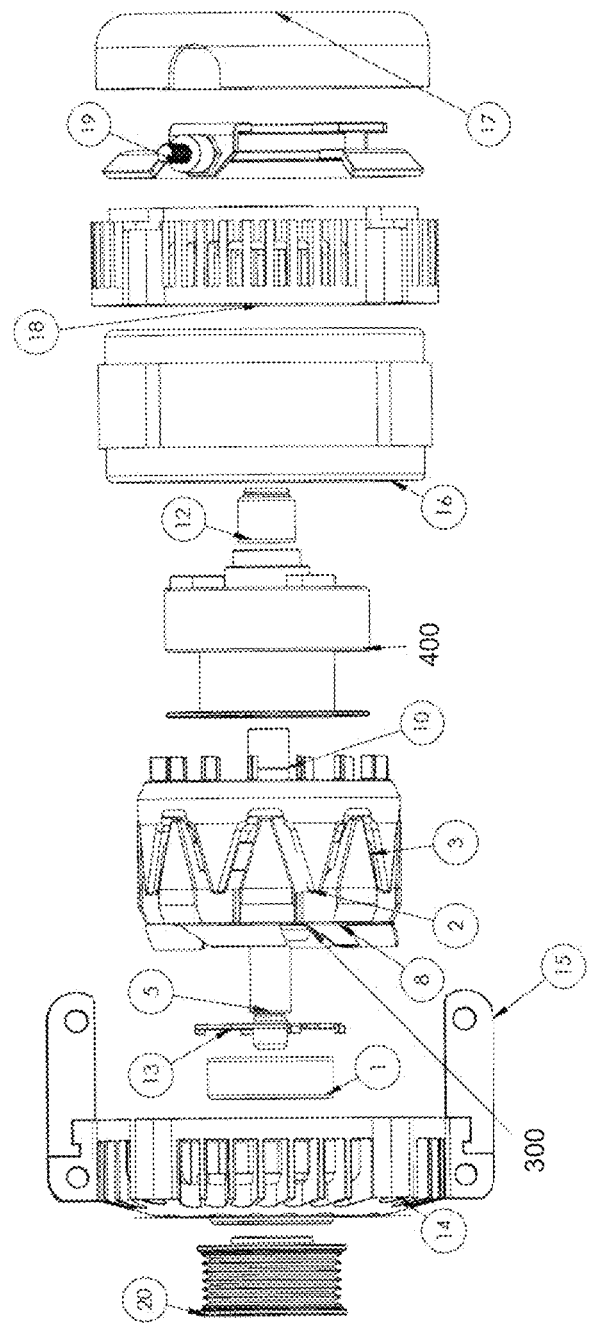
FIGS. 1C and 1D illustrate an example exploded view of a brushless alternator.
Figure 1D:
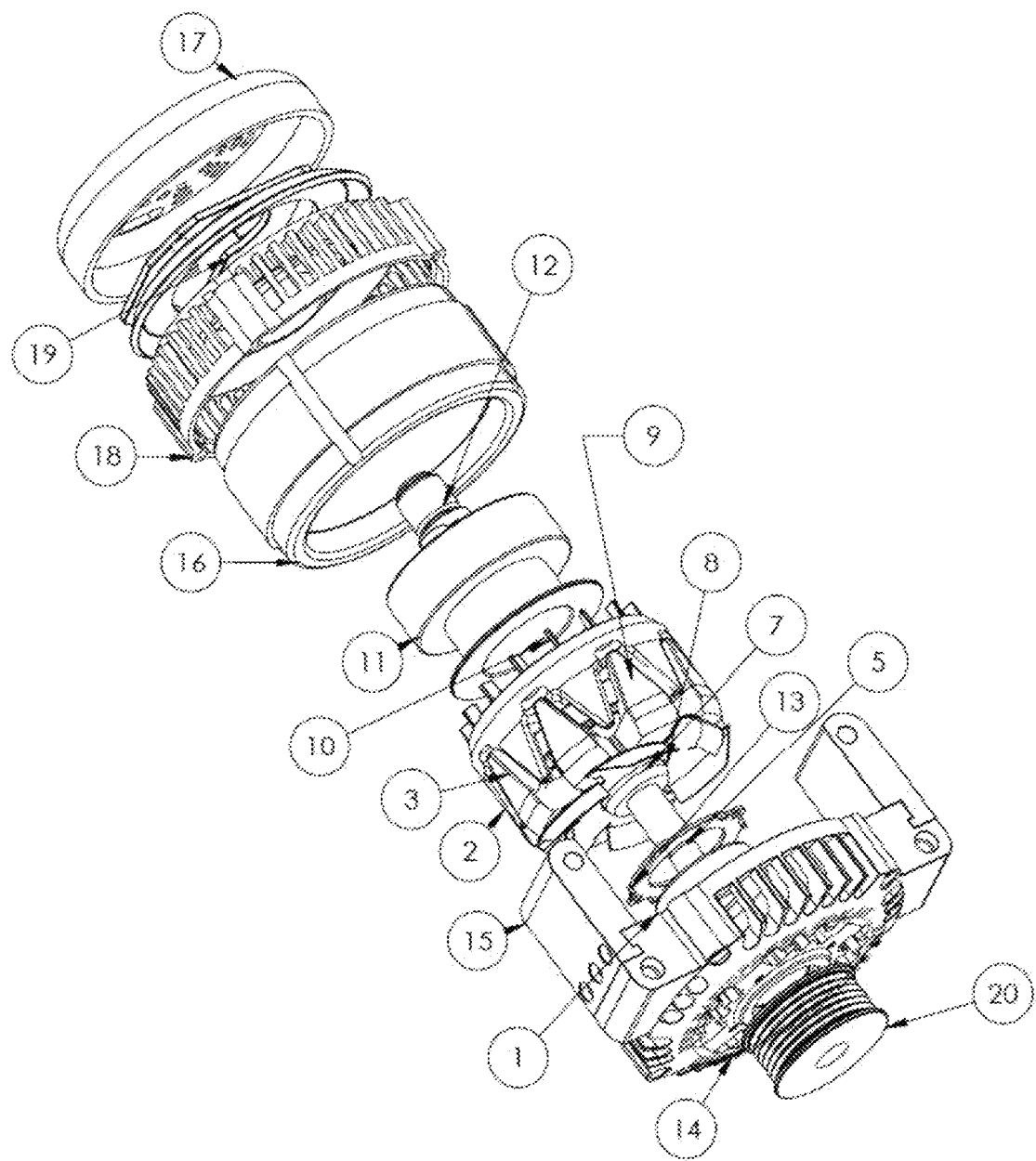

FIGS. 1A and 1B illustrate an exploded view of a known brushed alternator 1000 (such as but not limited to a Denso Alternator) which shall undergo conversion into a brushless alternator 100 (shown in FIGS. 1C and 1D) in accordance with an exemplary embodiment. The brushed alternator 1000 of the preferred embodiment comprises a stator 7 composed of a wire wound armature. The brushed alternator 10 also comprises a rotor 1, which is composed of a field winding, and which is disposed against the inner circumference side of the stator 7 when fully assembled. The vehicle alternator 1000 may further comprises cooling fan 12 which is fixed to an axial end face of the rotor 1, and which functions as a means for generating cooling air as the rotor 1 rotates. The brushed alternator 1000 also comprises a housing assembly including front-side housing 4 and a rear-side housing 10 that support the stator 7 and the rotor 1, a brush assembly for providing power to the field winding of the rotor 1, a voltage regulator for controlling output voltage to a predetermined value. The brushed alternator 1000 further comprises a brush holder 11 that covers electrical components such as the brush assembly and the voltage control apparatus to protect them from foreign objects, and a pulley 5 that transmits rotary driving force from an engine (not shown) to the rotor 1.

The front-side housing 4 is provided at its side portion with a plurality of cooling air exhaust vents. These cooling vents are provided to exhaust the cooling air to the outside of the front-side housing 4, which is generated by the rotation of the cooling fan 35 disposed at the side of the pulley 5 and is flowing in the centrifugal direction. The rear-side housing 10 is also provided at its side portion with a plurality of cooling air exhaust windows. These cooling air exhaust windows also function to exhaust the cooling air to the outside of the rear-side housing 10, which is generated by the rotation of the cooling fan being disposed at the side of the rear cover 11, and is flowing in the centrifugal direction.

A pair of slip rings are fixedly provided to a rotary shaft of the rotor 1 at its one end, which rotate with the rotary shaft. The brush assembly comprises the brush holder 11 that accommodates the slip rings and a pair of brushes each of which is in slide contact with one of the slip rings. The brush assembly also typically comprises a slip ring cover that covers the outer circumference of the slip rings in cooperation with the brush holder assembly.

The rear cover 10 is mounted to cover such electrical components in order to protect them from foreign objects that accommodate the brushes of the brush assembly, particularly the brush apparatus and the voltage control apparatus which are mounted outside the rear-side housing 10. The brush holder assembly has not been described in detail and as will be evident throughout the description, the presently described invention. in at least one embodiments, shows a method and assembly for converting a brushed alternator 1000 into a brushless alternator 100 by utilizing a number of parts from the brushed alternator 1000 without suffering any drop in electrical output.

In an initial step, the bolts that hold the housing assembly, particularly the front and rear housing covers 4 and 10 are removed to expose the stator 7. The electrical connections for the stator 7 are then uncoupled to remove the stator 7 and expose the rotor 1 and the fans 12. The next step involves removing the brush holder assembly. The bolts that are used for mounting the brush assembly may be re-used for mounting the replacement field coil 400 as will be explained in more detail. The removal of the brush assembly is followed by incorporation of the brushless components which are the subject of the presently described embodiment. The replacement brushless components for the brushless alternator 100 include a replacement rotor 300 (shown in FIGS. 1C, 1D and 2 to 5) and a field coil 400 shown in FIGS. 1C, 1D and FIGS. 7 to 9 which may be assembled with the stator 7 and the housing assembly and all other components from the brushed alternator 1000 to provide a repurposed brushless alternator 100 with similar electrical capacity.

Referring to FIGS. 2 to 6, the replacement rotor 300 is in the form of a claw pole rotor assembly having a pair of opposing pole pieces 310 and 320 with the rotor 300 defining an axis of rotation along a shaft 330. Each pole piece 310 and 320 comprises a plurality of circumferentially spaced pole fingers 312 and 322 respectively (which are trapezoidal or triangular in shape) extending axially. The pole fingers 312 and 322 for each pole piece alternate between north and south magnetic polarities upon energization of the field coil 400 that is positioned coaxially within an internal cavity 340 of the rotor to arrange the field coil in a spaced apart relationship relative to internal walls defining the internal cavity of the rotor 300. The provision of the internal cavity 340 within the rotor assembly 300 is an important difference when compared with the rotor 1 from the brushed alternator 1000 because the internal cavity 340 allows the field coil 400 to be accommodated within the space overall internal volume as the brushed alternator 10.

The internal cavity 340 is substantially cylindrical and allows the field coil 400 to be positioned between shaft 330 and internal walls defining the internal cavity 340 of the rotor 300. The field coil 400 comprises first and second cylindrical portions 410 and 420 that are configured to be positioned within the internal cavity in a spaced apart relationship relative to internal walls of the internal cavity 340 of the rotor 300.

Figure 7:
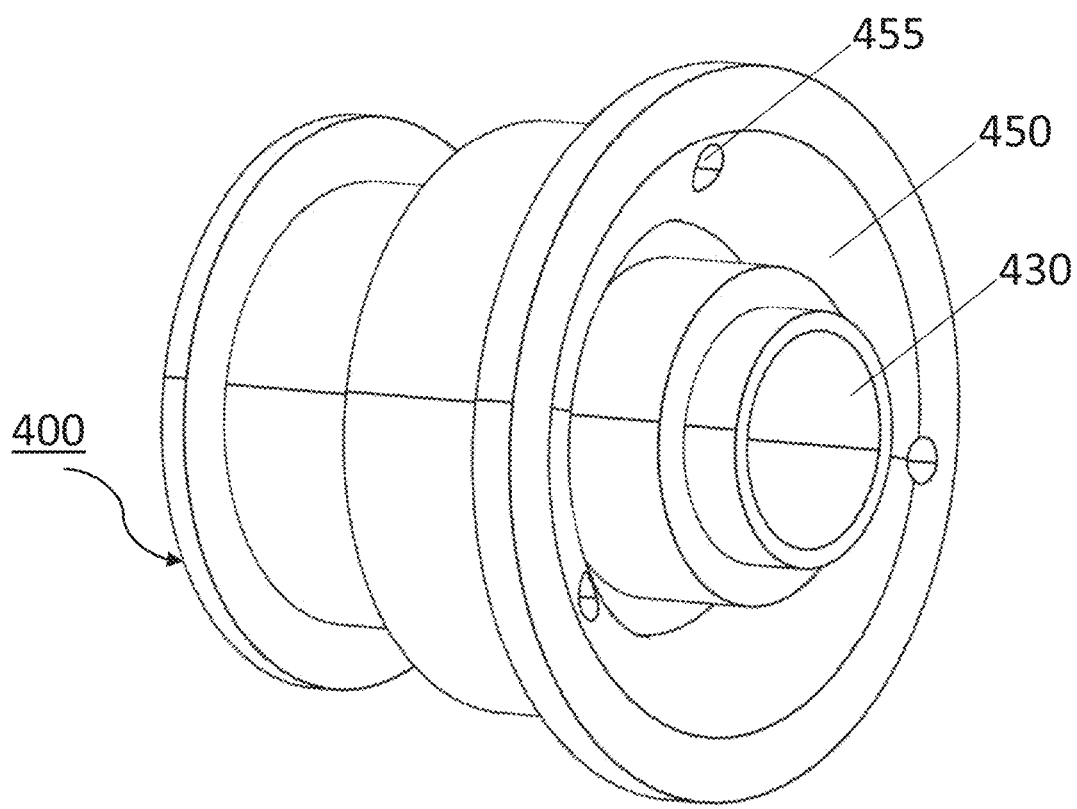
FIG. 7 illustrates a first view of an example field coil.
Figure 8:
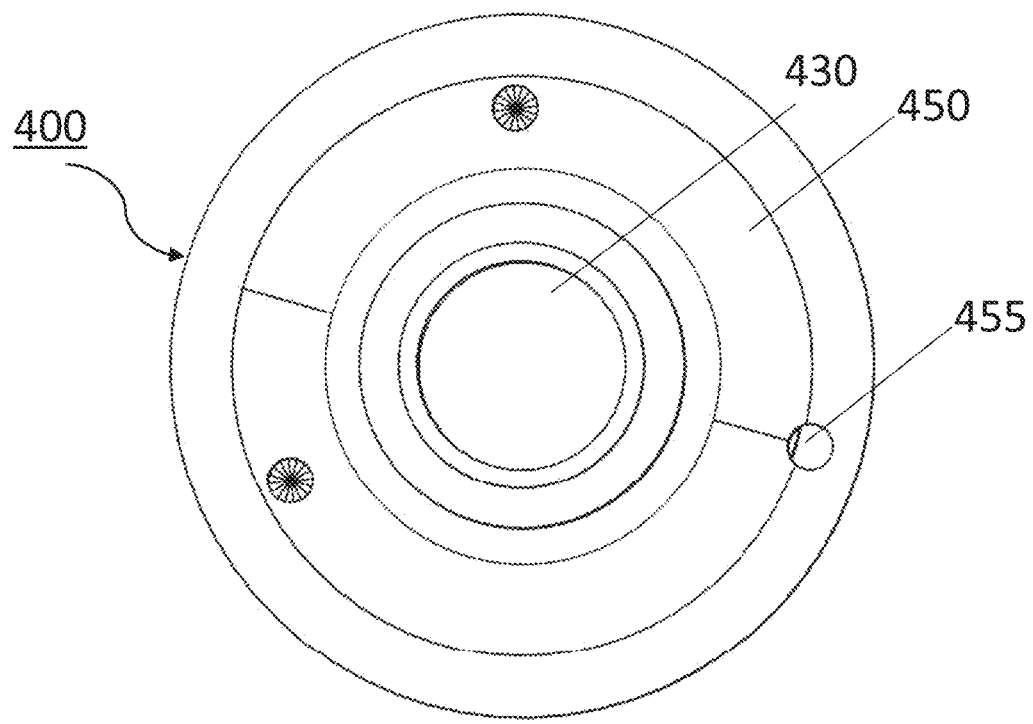
FIG. 8 illustrates another view of the field coil of FIG. 7.
Figure 9:
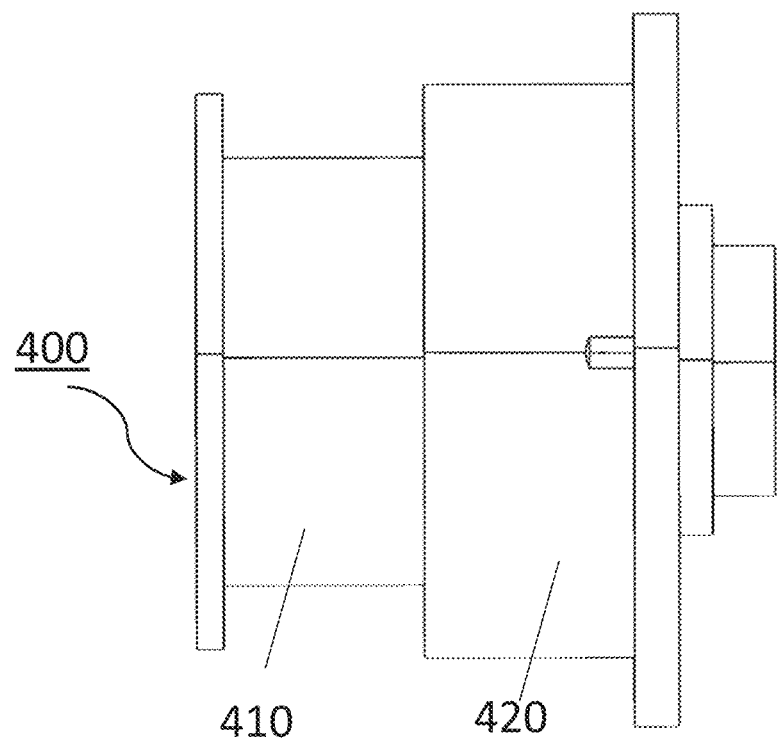
FIG. 9 illustrates another view of the field coil of FIG. 7.
Figure 10:
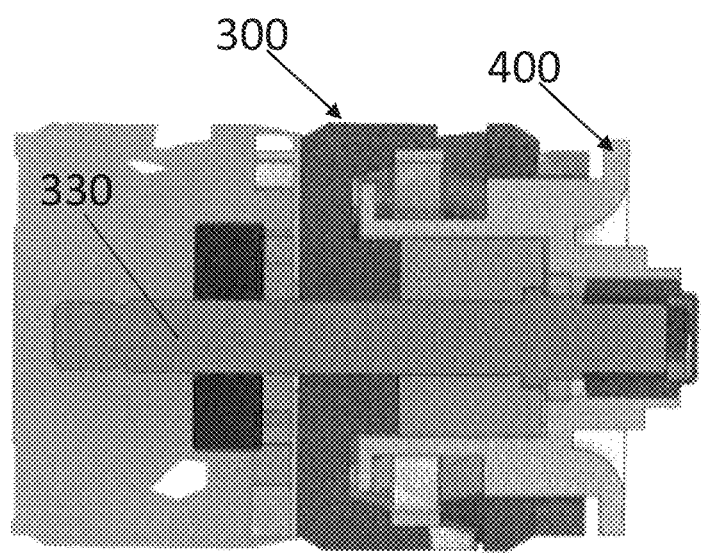
FIG. 10 illustrates a cross-sectional view of a portion of an example alternator assembly.

FIGS. 7 to 9 depict isolated views for the field coil 400 and FIG. 9 clearly shows that the first portion 410 of the field coil 400 comprises a first cylindrical portion with a smaller radius relative to a slightly more enlarged second portion 420 with a greater radius with a bore 430 extending therethrough to accommodate the passage of the shaft of the brushless rotor 300. Each of the axial ends of the field coil 400 include circumferential flanges and a medial surface 450 of the field coil includes bolt holes 455 for receiving bolts that can be used for fixedly attaching the field coil 400 to the housing assembly, particularly the rear housing whilst maintaining a spaced relationship between the field coil 400 and the rotor 300. The shape and configuration of the field coil 400 may vary depending upon the electrical requirements. For example, a field coil rated at 150 amperes is expected to be larger (a larger second portion 420) than a field coil rated at 90 amperes. The location of the bolt holes on the medial surface of the field coil 400 assists with fixed attachment of the field coil 400 to the housing.

We now refer to the detailed views of the brushless rotor 300 which has been briefly described in the previous sections. Unlike, the brushed rotor 1 in brushed alternator 1000 which required a separate cooling fan 12, the brushless alternator 100 does not require a separate cooling fan to be attached to the axial ends of the brushless rotor 300. Through extensive research and development efforts, the inventors have found that the removal of the brush assembly and the use of the field coil 400 necessitates a larger rotor size in order to provide magnetic field that is greater in magnitude compared with the brushed rotor 1. Instead of a separate cooling fan, axial ends of the brushless rotor 300 are provided with integrally formed air flow directing vanes 350 that are circumferentially arranged at the axial ends of the brushless rotor 300 and shaped to draw air through vents provided in walls of the housing assembly and directing the air in a radially inward direction towards the rotational axis of the drive shaft 330 when the rotor 300 undergoes rotation.

Figure 2:
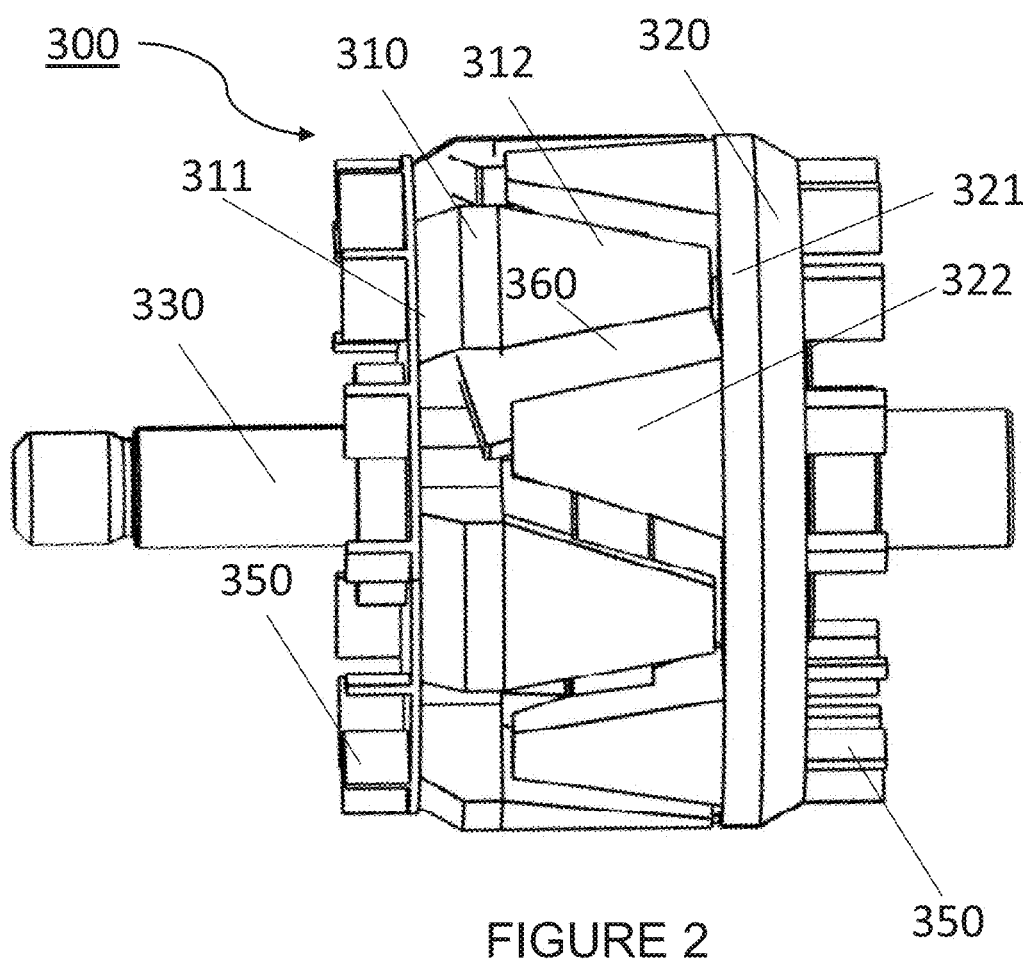
FIG. 2 illustrates a first view of an example rotor.
Figure 5:
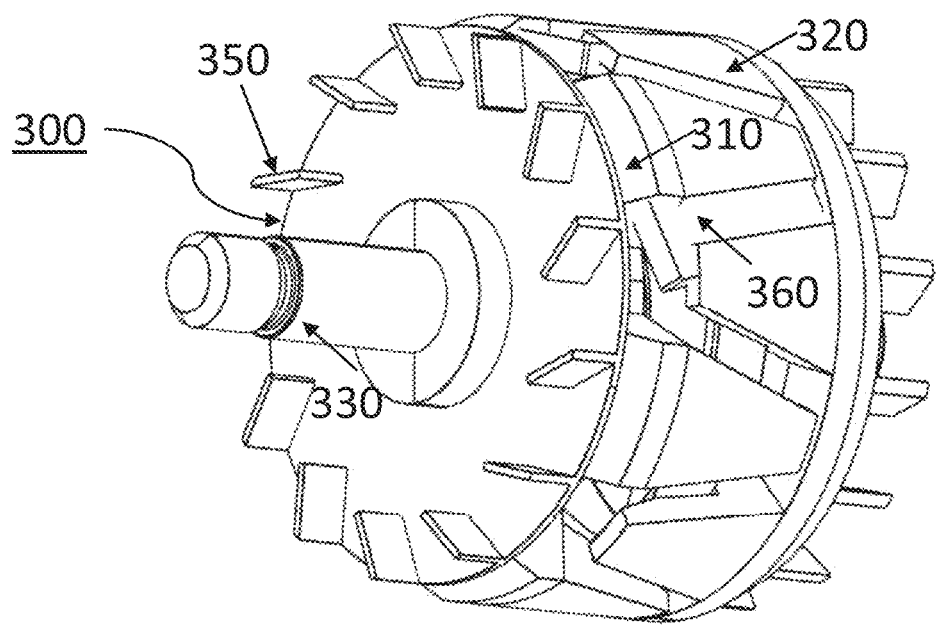
FIG. 5 illustrates another view of the rotor of FIG. 2.
Figure 6:
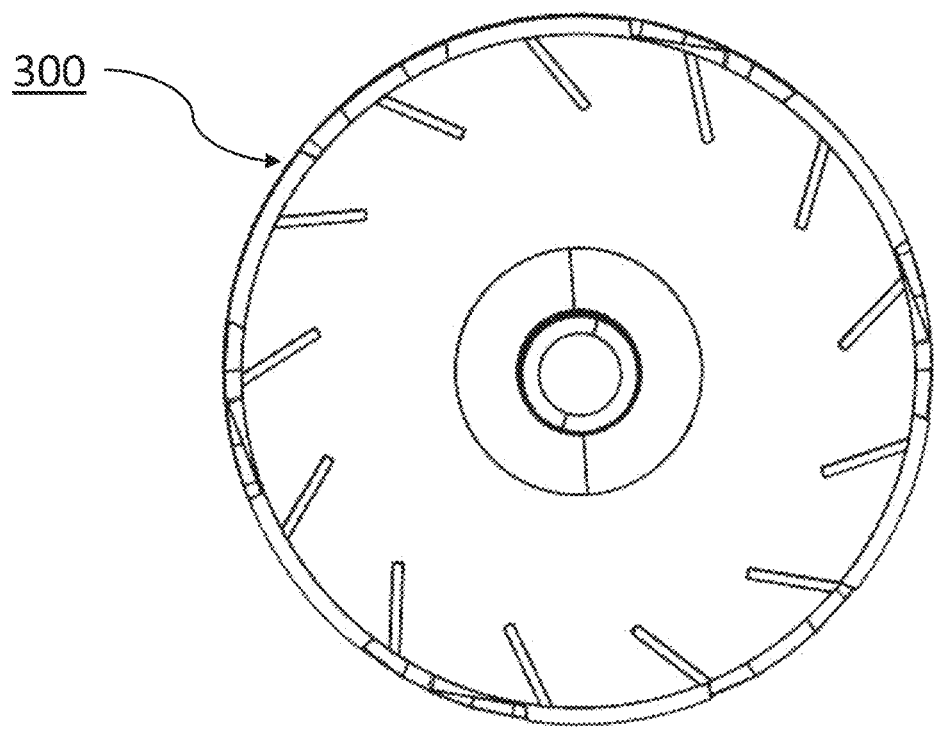
FIG. 6 illustrates another view of the rotor of FIG. 2.

Referring to FIGS. 2 and 5, each pole piece 310 and 320 includes a pole yoke 311 and 322 respectively which defines an axially facing surface, with the pole fingers 312 extending axially from the pole yoke such that the flow directing vanes 350 are integrally formed with the pole yoke of the brushless rotor 300. The pole yoke region for the brushless rotor 300 is relatively thicker than the pole yoke region of the brushed rotor 3 and incorporates additional volume that would otherwise be taken up by the cooling fan 35 in the brushed alternator 10. The provision of the integrally formed vanes 350 allow additional volume to be used within the pole yoke regions 312 and 322 of the brushless rotor 300 which in turn allows more magnetic material to be used within the brushless rotor thereby increasing the magnetic field strength without affecting the overall volume occupied by the converted brushless alternator 100.

Referring to FIG. 5, each of the vanes 350 comprises a leading edge 352 and trailing portion 354 formed integrally with the yoke of the brushless rotor 300 with a pair of planar and oppositely arranged air flow directing surfaces 356 and 358 of the vane 350 extending between the leading edge 352 and the trailing portion 354. Each of the vanes 350 are circumferentially arranged and shaped to draw air through vents provided in walls of the housing assembly 4 and directing the air in a radially inward direction towards the rotational axis of the drive shaft 330 when the rotor 300 undergoes rotation. The oppositely arranged air flow directing surfaces 356 and 358 are defined by an outer edge portion 353 and an inner edge portion 355 wherein the outer edge portion is located at a circumferentially outer location and wherein the inner edge is located at a radially inner portion. A first plurality of the vanes 350 are provided to surround the field coil 400 (when the field coil 400 is positioned in the cavity 340) at a first axial end of the brushless rotor 300 and a second plurality of the vanes are provided to surround the field coil 400 at the second axial end of the brushless rotor 300.

Figure 3:
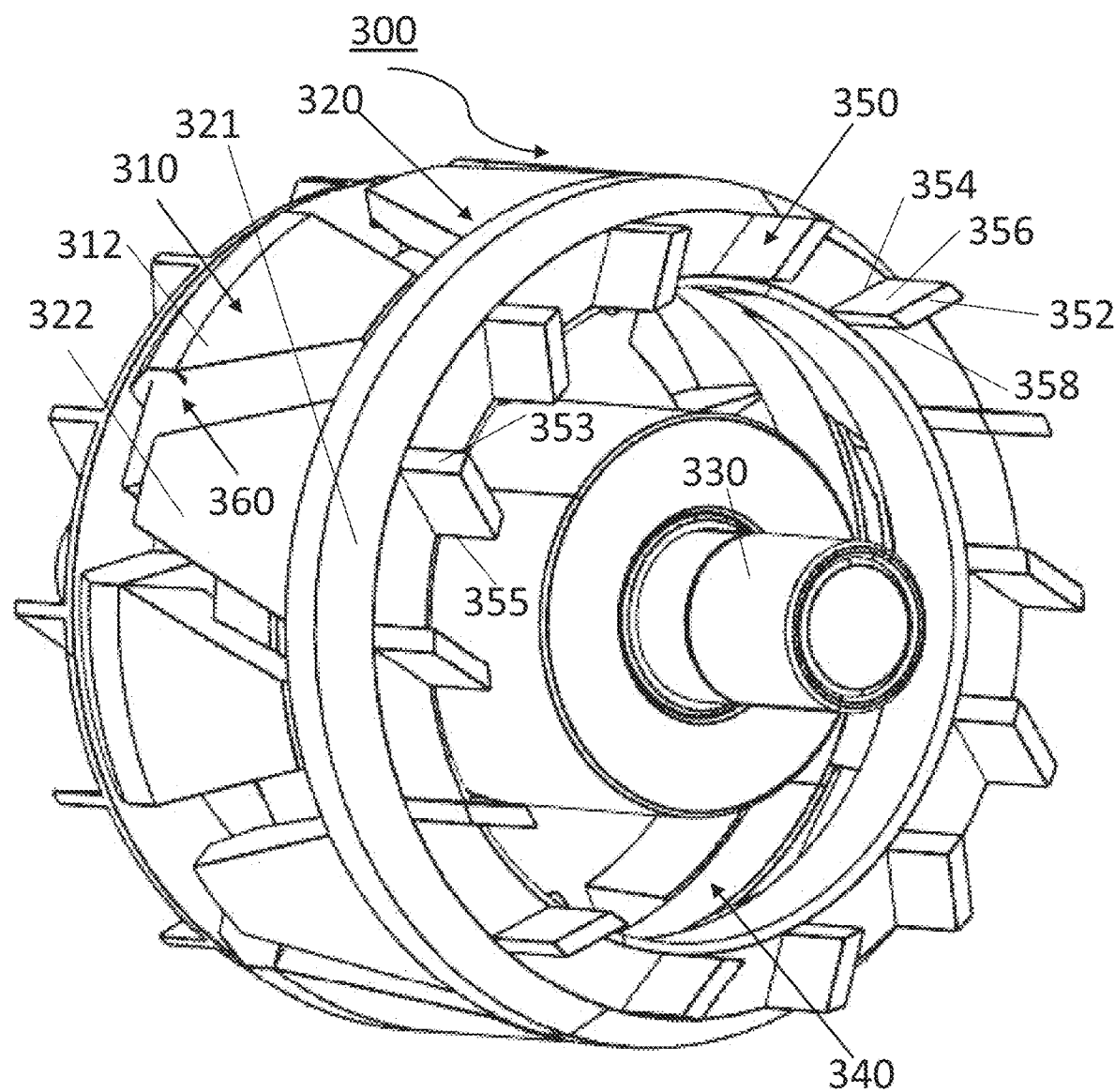
FIG. 3 illustrates another view of the rotor of FIG. 2.

Referring particularly to FIGS. 3 and 5, the pole fingers 312 and 322 comprise a trapezoidal shape which extend axially from an extreme radial outer edge of each of the pole piece (also referred to as the yoke 311 and 321 in previous sections) towards the other pole piece. Each pole finger of a pole piece is situated in a space defined between two consecutive pole fingers of the other pole piece and an interpole space magnetic assembly 360 is disposed in at least one interpole space between a pair of adjacently located pole fingers of the first and second pole piece. Grooves are provided along the sides of each of the pole fingers 312 and 322 to allow the interpole magnetic assembly 360 to be disposed within the interpole space to further increase the overall volume of magnetic material used for the brushless rotor 300. The interpole space magnetic assembly 360 comprises magnetic material that can be received in a groove located in spaced edge portions of the pair of adjacently located pole fingers. The interpole space magnetic assembly comprises a first lateral portion 362 adapted to be engaged with a first of the pair of the pole fingers 312 and 322 and a second lateral portion 364 adapted to be engaged with a second of the pair of pole fingers 312 and 322 such that the first and second lateral portions have opposite polarities. In the preferred embodiment, interpole piece 360 comprises a T shaped configuration with a portion of the interpole piece being positioned in close proximity with a respective yoke portion (311 or 321). It is important to note that the number of interpole pieces 360 used for each brushless rotor 300 may vary in accordance with the desired electrical output requirements of the brushless rotor 300. Therefore, a number of interpole pieces 360 may be added in between any pair of adjacent pole fingers 312 and 322 to increase the overall magnetic field strength imparted by the brushless rotor 300.

The provision of the interpole pieces 360 and the integrally formed vanes 350 in combination with the field coil 400 being positioned in an internal cavity 340 provides a novel configuration for a brushless alternator 300 that can be easily assembled by starting from a commercially available brushed alternator (such as brushed alternator 10). The overall volume occupied by the brushless alternator 100 during use in the engine bay is substantially same as the volume occupied by the brushed alternator 10. Therefore, the novel brushless alternator 100 provides a great alternative particularly when commercial vehicles are being re-purposed or modified for use in harsher environments where the brush assembly of a conventional brushed alternator may be susceptible to wear and tear.

Figure 11:
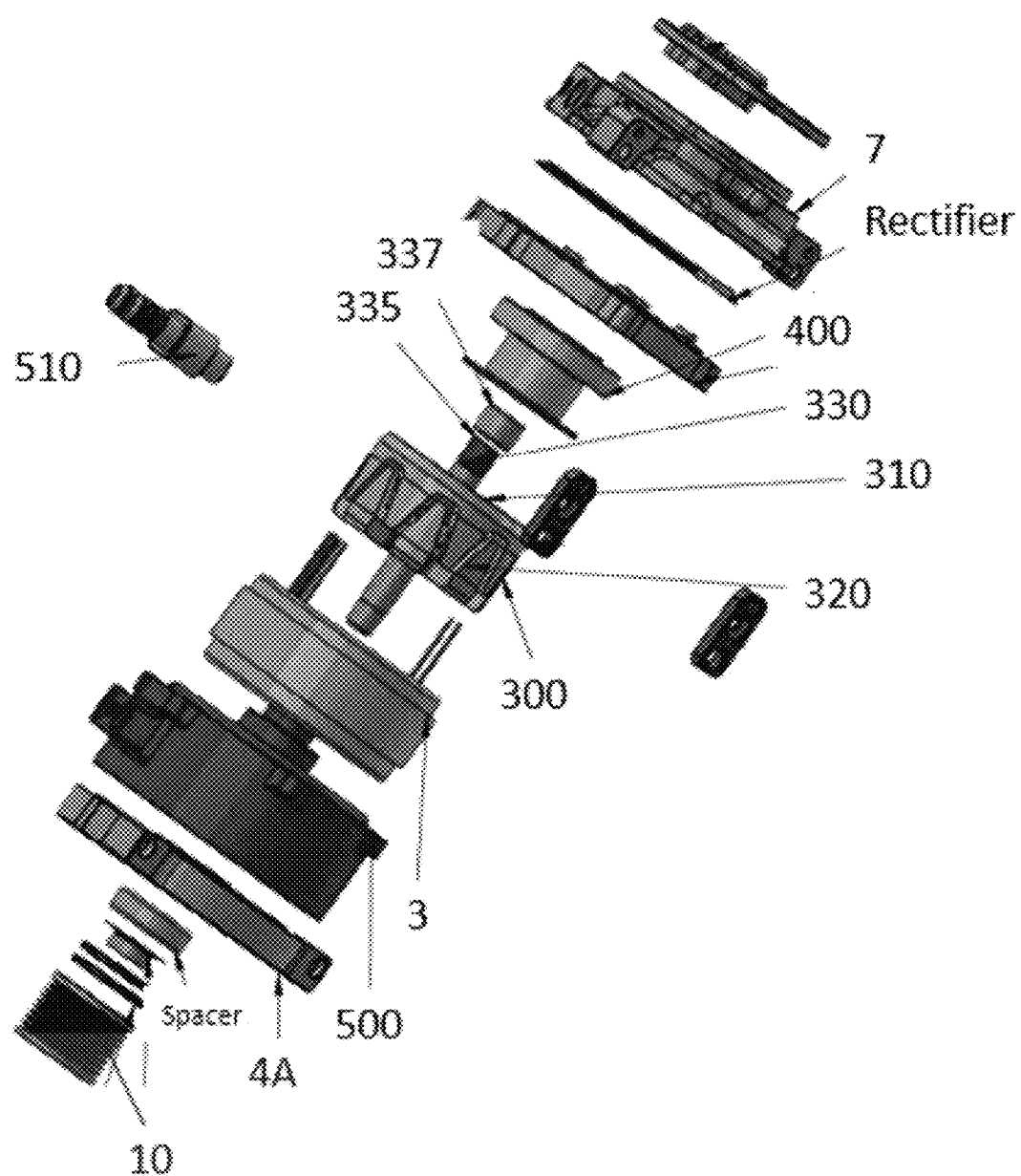
FIG. 11 illustrates an exploded view of an example alternator assembly.
Figure 12:
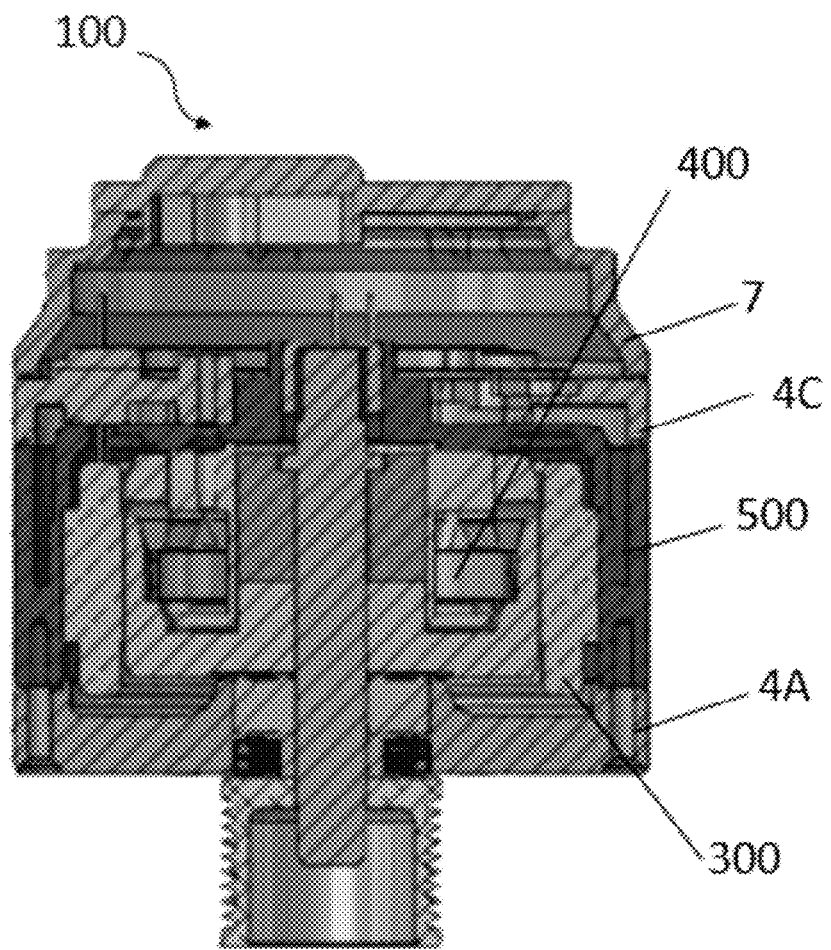
FIG. 12 illustrates a cross-sectional view of an example alternator assembly.
Figure 13:
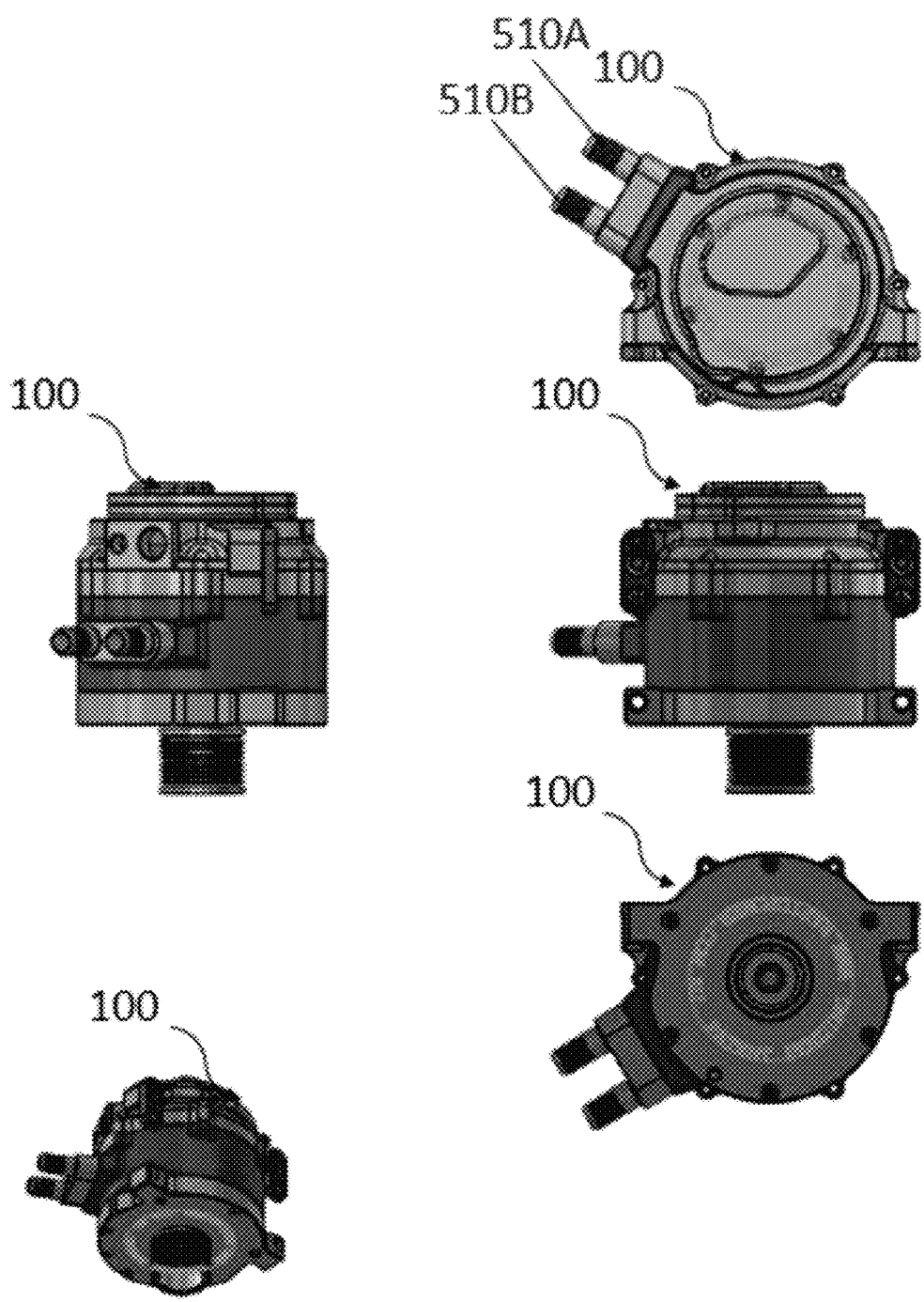
FIG. 13 illustrates various perspective views of an example alternator assembly.

Referring to FIGS. 11 to 13, another alternative embodiment of a brushless alternator 100A has been illustrated. Like reference numerals denote like features that have been previously described. Unlike, the brushed rotor 1 which required a separate cooling fan 12, the brushless alternator 100A for the present embodiment does not require a separate cooling fan 12 to be attached to the axial ends of the brushless rotor 300. The inventors have found that the removal of the brush assembly and the use of the field coil 400 necessitates a larger rotor size in order to provide magnetic field that is greater in magnitude compared with the brushed rotor 1. Instead, a separate cooling jacket 500 (which will be explained in more detail in the foregoing sections) replaces the middle housing member 8 with a rear facing panel 7. The cooling jacket 500 is structured to substantially surround the stator 3 (See FIGS. 11 and 12). The cooling jacket 500 comprises a hollow jacket which allows circulation of liquid phase coolant through the jacket 500. The cooling jacket is provided with at least one inlet 510A and one outlet 510B (See FIG. 13) that allows liquid coolant such as the coolant from the radiator cooling system of a vehicle to be circulated through the internal fluid flow passages through the body of the jacket 500 to absorb heat from a region surrounding the cylindrical stator 3.

Figure 4:
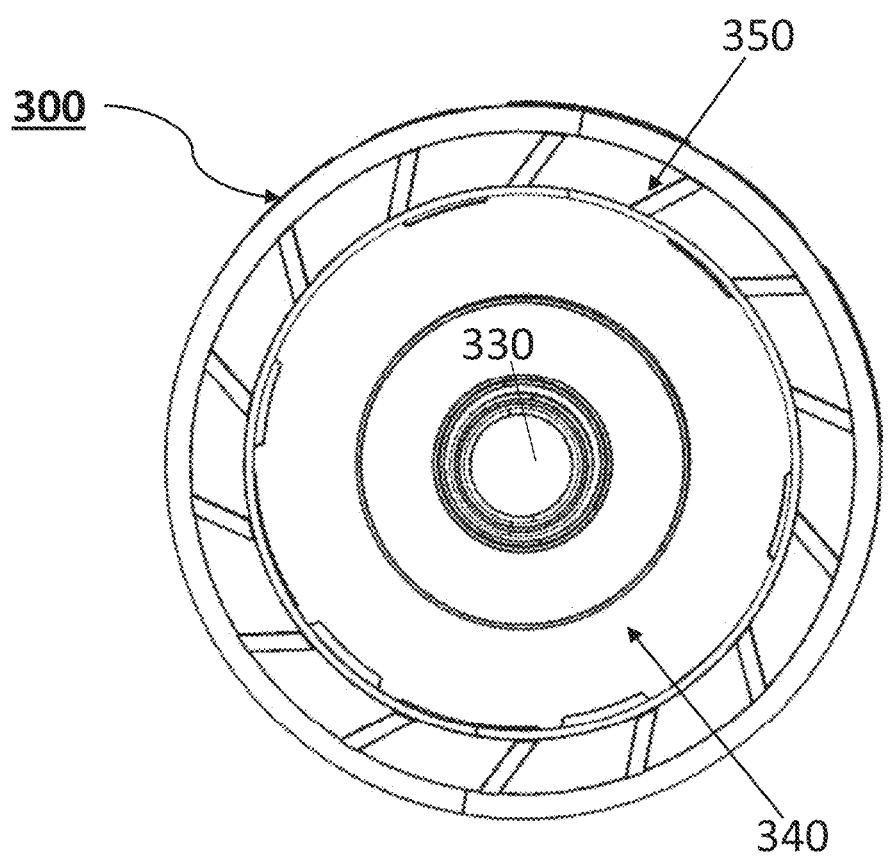
FIG. 4 illustrates another view of the rotor of FIG. 2.

Referring to FIGS. 2 and 4, each pole piece 310 and 320 includes a respective pole yoke 311 and 322 respectively which defines an axially facing surface, with the pole fingers 312 extending axially from the pole yoke. The pole yoke region for the brushless rotor 300 is relatively thicker than the pole yoke region of the brushed rotor 3 and incorporates additional volume that would otherwise be taken up by the cooling fan 35 in the brushed alternator 10. The provision of the cooling jacket 500 allow additional volume to be used within the pole yoke regions 312 and 322 of the brushless rotor 300 which in turn allows more magnetic material to be used within the brushless rotor thereby increasing the magnetic field strength without affecting the overall volume occupied by the converted brushless alternator 100. The positioning and structure of the water cooling jacket 500 provides for the cooling jacket to also surround the field coil 400 when the field coil 400 is positioned in the cavity 340.

The provision of the interpole pieces 360 and the water-cooling jacket 500 in combination with the field coil 400 being positioned in an internal cavity 340 provides a novel configuration for a brushless alternator 300 that can be easily assembled by starting from a commercially available brushed alternator (such as brushed alternator 10). The overall volume occupied by the brushless alternator 100 during use in the engine bay is substantially same as the volume occupied by the brushed alternator 10. Therefore, the novel brushless alternator 100 provides a great alternative particularly when commercial vehicles are being re-purposed or modified for use in harsher environments where the brush assembly of a conventional brushed alternator may be susceptible to wear and tear.

In compliance with the statute, the invention has been described in language more or less specific to structural or methodical features. The term "comprises" and its variations, such as "comprising" and "comprised of" is used throughout in an inclusive sense and not to the exclusion of any additional features.

It is to be understood that the invention is not limited to specific features shown or described since the means herein described comprises preferred forms of putting the invention into effect.

The invention is, therefore, claimed in any of its forms or modifications within the proper scope of the appended claims appropriately interpreted by those skilled in the art.

The invention claimed is:

1. A vehicle brushless alternator assembly comprising:
a claw pole rotor assembly having a pair of opposing pole pieces, the claw pole rotor assembly defining an axis of rotation along a drive shaft of the claw pole rotor assembly, each of the pole pieces having a plurality of circumferentially spaced pole fingers extending axially, the pole fingers of the pole pieces alternating between north and south magnetic polarities upon energization of a field coil;
a cylindrical stator comprising armature enveloping the pole pieces, the cylindrical stator arranged coaxially relative to the drive shaft;
a field coil structured to be positioned coaxially within an internal cavity of said claw pole rotor assembly to arrange the field coil in a spaced apart relationship relative to internal walls defining the internal cavity of the claw pole rotor assembly; and
a housing assembly surrounding said cylindrical stator with the drive shaft being supported by the housing assembly wherein the field coil is fixedly mounted to the housing assembly
wherein the field coil further comprises: an axial surface that is spaced away from inner walls defining the internal cavity of the claw pole roto assembly; and a medial surface of the field coil that is substantially transverse relative to the axis of rotation wherein the medial surface is configured for being mounted to the housing assembly.

2. A vehicle brushless alternator assembly in accordance with claim 1 wherein at each end portion of the claw pole rotor assembly, air flow directing vanes are circumferentially arranged and shaped to draw air through vents provided in walls of the housing assembly and direct the air in a radially inward direction towards the rotational axis of the drive shaft when the claw pole rotor assembly undergoes rotation.

3. A vehicle brushless alternator assembly in accordance with claim 2 wherein each pole piece includes a pole yoke which defines an axially facing surface, with the pole fingers extending axially from the pole yoke such that the air flow directing vanes are integrally formed with the pole yoke of the claw pole rotor assembly.

4. A vehicle brushless alternator assembly in accordance with claim 2 wherein each vane of the air flow directing vanes comprises a leading edge and a trailing edge formed integrally with a pole yoke of the claw pole rotor assembly with a pair of oppositely arranged air flow directing surfaces of each vane extending between the leading edge and the trailing edge of each vane.

5. A vehicle brushless alternator assembly in accordance with claim 4 wherein the oppositely arranged air flow directing surfaces are defined by an outer edge portion and an inner edge portion wherein the outer edge portion is located at a circumferentially outer location and wherein the inner edge portion is located at a radially inner portion.

6. A vehicle brushless alternator assembly in accordance with claim 2 wherein in at least a first arrangement, a first plurality of vanes are arranged to surround the field coil positioned in the internal cavity during use.

7. A vehicle brushless alternator assembly in accordance with claim 1 wherein the pole fingers of each pole piece comprise a trapezoidal shape which extend axially from an extreme radial outer edge of each pole piece towards the other pole piece, such that each pole finger of each pole piece is situated in a space defined between two consecutive pole fingers of the other pole piece; and a interpole space magnetic assembly is disposed in at least one interpole space between a pair of adjacently located pole fingers of the pair of opposing pole pieces.

8. A vehicle brushless alternator assembly in accordance with claim 7 wherein the interpole space magnetic assembly comprises magnetic material configured to be received in a groove located in spaced edge portions of the pair of adjacently located pole fingers.

9. A vehicle brushless alternator assembly in accordance with claim 7 wherein the claw pole rotor assembly comprises a first lateral portion adapted to be engaged with a first of the pair of adjacently located pole fingers and a second lateral portion adapted to be engaged with a second of the pair of adjacently located pole fingers such that the first and second lateral portions have opposite polarities.

10. A vehicle brushless alternator assembly in accordance with claim 1 wherein the internal cavity is substantially cylindrical for receiving a cylindrical portion of the field coil.

11. A vehicle brushless alternator assembly in accordance with claim 1 wherein the medial surface comprises a fastening arrangement for mounting the field coil on the housing assembly.

12. A vehicle brushless alternator assembly in accordance with claim 1 wherein the housing assembly comprises a hollow cooling jacket shaped to substantially surround the field coil, the hollow cooling jacket comprising a coolant block with a coolant inlet and a coolant outlet for circulation of a liquid phase coolant therethrough.

13. A vehicle brushless alternator assembly in accordance with claim 12 wherein during use the hollow cooling jacket is positioned between a frontal housing member and a rear housing member and wherein body portions of the cooling jacket are structured to be fastened to the frontal housing member and the rear housing member.

14. A vehicle brushless alternator assembly in accordance with claim 12 wherein the hollow cooling jacket comprises internal fluid flow passages to allow flow of the liquid phase coolant through a body of the jacket to absorb heat from a region surrounding the cylindrical stator.

15. A method of modifying a brushed alternator for vehicles, wherein the brushed alternator comprises: a housing assembly including a first portion, and a second portion having a plurality of electrical connectors and having an aperture; a cylindrical stator supported at least partially by the first portion of the housing assembly; a rotor assembly including first and second slip rings, and including a drive shaft configured to rotate about an axis, the drive shaft having first and second ends; and a removable brush assembly removably mounted to the housing assembly, a resistor, and brush blocks configured to support brushes for engagement with the slip rings, to pass a force current through the rotor assembly via the slip rings, the method comprising the steps of:
removing the brush assembly mounted to the housing assembly;
removing the rotor assembly and replacing said rotor assembly with a replacement claw pole rotor assembly having a pair of opposing pole pieces, the replacement claw pole rotor assembly defining an axis of rotation along a drive shaft of the replacement claw pole rotor assembly, each of the pole pieces having a plurality of circumferentially spaced pole fingers extending axially, the pole fingers of the pole pieces alternating between north and south magnetic polarities upon energization of a field coil;

positioning a field coil coaxially within an internal cavity of the replacement rotor assembly to arrange the field coil in a spaced apart relationship relative to internal walls defining the internal cavity of the replacement rotor assembly wherein the field coil comprises an axial surface that is spaced away from inner walls defining the internal cavity of the rotor assembly; and a medial surface of the field coil that is substantially transverse relative to the axis of rotation wherein the medial surface is configured for being mounted to the housing assembly;

positioning the cylindrical stator to envelop the pole pieces, the cylindrical stator being arranged coaxially relative to the drive shaft;

positioning the housing assembly to surround the cylindrical stator with the drive shaft of the replacement rotor assembly being supported by the housing assembly; and fixedly mounting the medial surface of the field coil to the housing assembly.

* * * * *